US012015581B1

(12) United States Patent
Rodriguez Bravo et al.

(10) Patent No.: US 12,015,581 B1
(45) Date of Patent: Jun. 18, 2024

(54) SELECTIVELY EXCLUDE RECIPIENTS FROM AN END-TO-END ENCRYPTION ENABLED GROUP CHAT

(71) Applicant: Kyndryl, Inc., New York, NY (US)

(72) Inventors: Cesar Augusto Rodriguez Bravo, Alajuela (CR); David Alonso Campos Batista, Aurora (CR)

(73) Assignee: Kyndryl, Inc., New York, NY (US)

( * ) Notice: Subject to any disclaimer, the term of this patent is extended or adjusted under 35 U.S.C. 154(b) by 0 days.

(21) Appl. No.: 18/351,554

(22) Filed: Jul. 13, 2023

(51) Int. Cl.
*H04L 51/04* (2022.01)
*H04L 9/08* (2006.01)
*H04L 51/063* (2022.01)

(52) U.S. Cl.
CPC ............ *H04L 51/04* (2013.01); *H04L 9/0819* (2013.01); *H04L 51/063* (2013.01)

(58) Field of Classification Search
None
See application file for complete search history.

(56) References Cited

U.S. PATENT DOCUMENTS

| | | | | |
|---|---|---|---|---|
| 6,782,475 | B1* | 8/2004 | Sumner | H04L 63/065 380/255 |
| 6,832,314 | B1* | 12/2004 | Irvin | H04W 12/037 713/168 |
| 9,043,406 | B2 | 5/2015 | Beadle et al. | |
| 9,413,700 | B1 | 8/2016 | Jerrard-Dunne et al. | |
| 10,218,657 | B2* | 2/2019 | Cheung | H04L 12/1822 |
| 10,684,746 | B2 | 6/2020 | Chen et al. | |
| 11,463,388 | B2* | 10/2022 | Shtendel | G06Q 10/10 |
| 11,539,646 | B2* | 12/2022 | Rieseberg | H04L 51/52 |
| 2003/0125927 | A1* | 7/2003 | Seme | H04L 51/063 704/3 |
| 2007/0245143 | A1* | 10/2007 | Duckeck | H04L 9/00 713/168 |

(Continued)

FOREIGN PATENT DOCUMENTS

DE 112012002343 T5 2/2014

OTHER PUBLICATIONS

Anonymous, "Smart Chat Application Management System," IP.com Prior Art Database Technical Disclosure, IPCOM000255903D, Oct. 19, 2018, 4 pages.

*Primary Examiner* — Ranodhi Serrao
(74) *Attorney, Agent, or Firm* — CANTOR COLBURN LLP; Erik Swanson

(57) ABSTRACT

Embodiments include receiving input of a new message for a group of members having end-to-end encryption in which first keys encrypt and second keys decrypt the new message, determining that a subset of the members in the group is excluded from receiving the new message, and selectively encrypting the new message for the members of the group by encrypting the new message by first keys corresponding to ones of the members of the group while choosing not to encrypt the new message with first keys corresponding to the subset of the members. An aspect includes transmitting the new message encrypted by the first keys to the members, and in response to choosing not to encrypt the new message with first keys corresponding to the subset, causing a system message to be transmitted to the subset excluded from receiving the new message, the system message affecting a presentation to the subset.

20 Claims, 12 Drawing Sheets

(56) References Cited

U.S. PATENT DOCUMENTS

| | | | |
|---|---|---|---|
| 2009/0147958 A1* | 6/2009 | Calcaterra | H04L 9/0833 |
| | | | 380/260 |
| 2009/0177974 A1 | 7/2009 | Cox et al. | |
| 2011/0188655 A1* | 8/2011 | Moreillon | H04L 9/0891 |
| | | | 380/255 |
| 2011/0249083 A1* | 10/2011 | Allegro | H04L 51/00 |
| | | | 348/14.1 |
| 2013/0244614 A1* | 9/2013 | Santamaria | H04W 12/069 |
| | | | 455/411 |
| 2013/0318347 A1* | 11/2013 | Moffat | H04L 63/0435 |
| | | | 713/168 |
| 2018/0241705 A1* | 8/2018 | Sarafa | H04L 9/0827 |
| 2019/0238489 A1 | 8/2019 | Cohen | |
| 2021/0400130 A1 | 12/2021 | Ridgill, II et al. | |
| 2022/0337541 A1* | 10/2022 | Rieseberg | G06F 21/6245 |
| 2023/0179556 A1* | 6/2023 | Rieseberg | H04L 51/063 |
| | | | 709/206 |

* cited by examiner

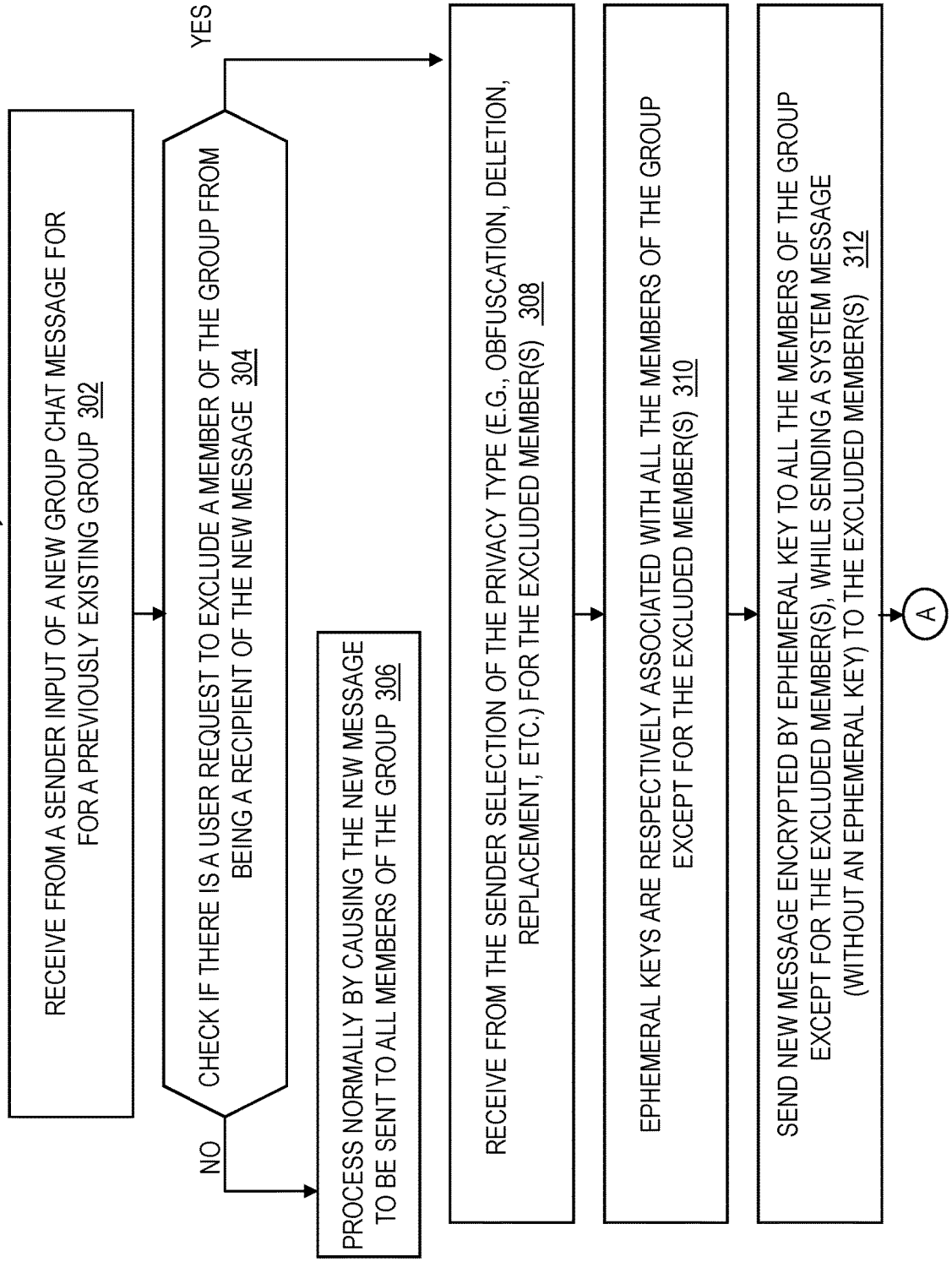

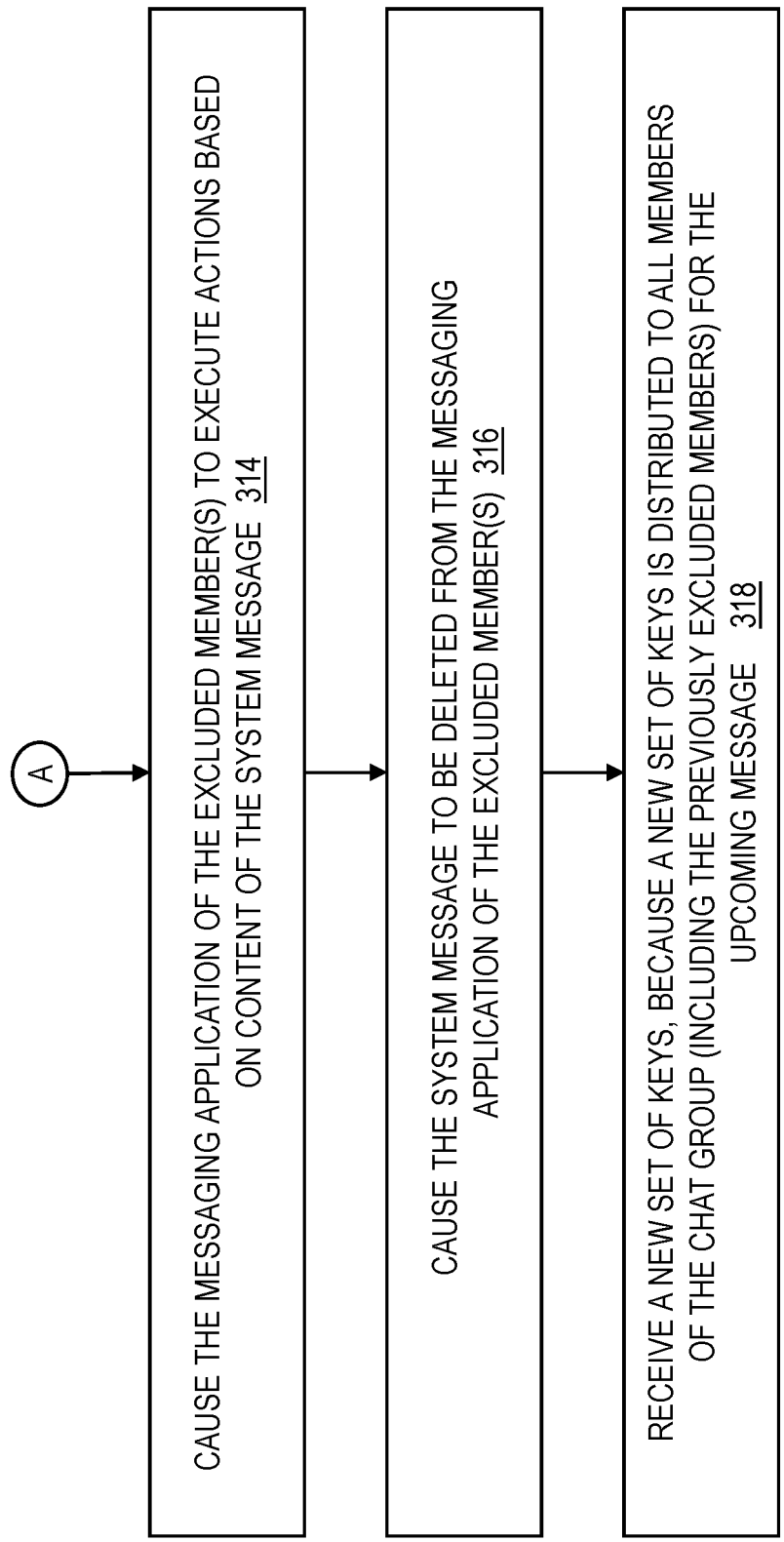

SELECTIVELY EXCLUDE RECIPIENTS FROM AN END-TO-END ENCRYPTION ENABLED GROUP CHAT

BACKGROUND

The present invention generally relates to computer systems, and more specifically, to computer-implemented methods, computer systems, and computer program products configured and arranged to selectively exclude recipients from an end-to-end encryption enabled group chat.

Data encryption is the process of using an algorithm that transforms standard text characters into an unreadable format. Data encryption uses keys to scramble data so that only authorized users can read it. End-to-end encryption (E2EE) uses this same process, too. End-to-end encryption takes it a step further by securing communications from one endpoint such as a user terminal to another endpoint such as another user terminal. In many messaging services without end-to-end encryption, third parties store the data from the sender, which is encrypted only in transit to the receiver. This server-side encryption method secures the data from unauthorized viewers only but does not provide end-to-end encryption between the sender and receiver. In the case of end-to-end encryption, encrypted data is only viewable by those with decryption keys. In other words, end-to-end encryption prevents unintended users, including third parties, from reading or modifying data when only the intended readers should have this access and ability.

SUMMARY

Embodiments of the present invention are directed to computer-implemented methods for selectively excluding recipients from an end-to-end encryption enabled group chat. A non-limiting computer-implemented method includes receiving input of a new message for a group of members, the group including end-to-end encryption in which first keys of the members are for encrypting the new message and second keys of the members are for decrypting the new message. The method includes determining that a subset of the members in the group is to be excluded from receiving the new message. The method includes selectively encrypting the new message for the members of the group, the selectively encrypting including encrypting the new message by ones of the first keys corresponding to ones of the members of the group while choosing not to encrypt the new message with any of the first keys corresponding to the subset of the members. The method includes transmitting the new message encrypted by the ones of the first keys to the ones of the members of the group. Also, the method includes, in response to choosing not to encrypt the new message with any of the first keys corresponding to the subset of the members, causing a system message to be transmitted to the subset of the members excluded from receiving the new message, the system message affecting a presentation to the subset of the members.

Other embodiments of the present invention implement features of the above-described methods in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIGS. 3A and 3B are a flowchart of a computer-implemented method for selectively excluding one or more recipients from an end-to-end encryption enabled group chat according to one or more embodiments of the present invention;

DETAILED DESCRIPTION

Figure 1:
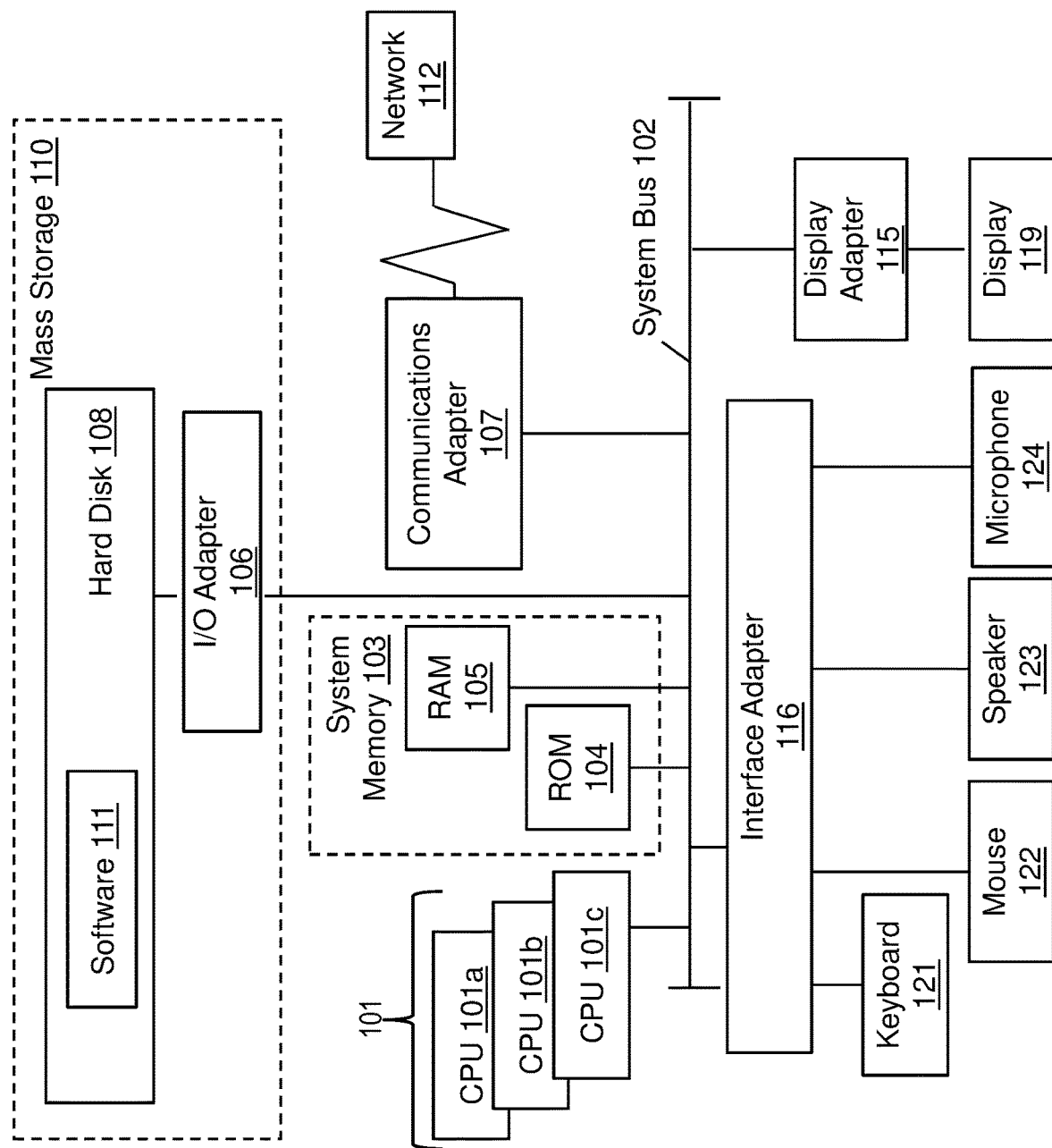
FIG. 1 depicts a block diagram of an example computer system for use in conjunction with one or more embodiments of the present invention.

One or more embodiments are configured and arranged to selectively exclude recipients from an end-to-end encryption enabled group chat. One or more embodiments provide a secure method to obscure a message to one or more recipients for a selected group of people inside a group chat using end-to-end encryption, while other recipients receive the message. In one or more embodiments, the secure method selectively obscures a message, deletes the message, and/or changes the message to one or more recipients in the selected group chat using end-to-end encryption, while other recipients receive the message.

Messaging applications, messenger applications, chat applications, instant messaging applications, etc., are formed of software that enables messages to be sent and received. The messages may be text as well as audio and video. Messaging applications can transmit and receive a much wider range of data types than Short Message Service (SMS) or Multimedia Messaging Service (MMS). In addition to voice calls, video calls, and text, users of messaging applications can send and receive files, images, audio, location data, emojis, and in some cases documents.

Messaging applications have something in common in that a user can create groups to talk with people by sending and receiving messages. The group can be referred to as a group chat. A group chat is the type of chat that allows the users to communicate with multiple people in the entire group at the same time. The content shared in the group is visible for all the participants. However, suppose a user wishes to share a message with some of the people that are part of the group but not all. With today's implementations, the user can generally take the following three actions: (1) send the content separately to each person, (2) create a new group with the people the user wishes to send the SMS message to, and (3) remove the person from the group (only if you are the administrative authority of the group). These examples are time consuming and can negatively impact the user experience.

One may think that a sender could cause a server to delete the message for a person in a group chat for the person that the sender wishes not to receive the message. Due to privacy, the server does not and cannot review the data because the data is sent directly to the other user using end-to-end encryption. Most common messaging applications such as, for example, WHATSAPP®, SIGNAL®, FACEBOOK MESSENGER®, VIBER®, SKYPE®, etc., use the Signal Protocol (designed by Open Whisper Systems) for end-to-end encryption. This end-to-end encryption protocol is designed to prevent third parties (including the companies that own the messaging applications) from having plaintext access to messages or calls. Therefore, this means that the processing of the data is performed at the application level. Accordingly, under this current mechanism, if the user wishes to delete a message, it will be the messaging application that deletes the message; this means that the message arrives at the device, for at least some time (e.g., a few milliseconds), which represents a security risk.

According to one or more embodiments, a secure method is provided for selecting a selected group of people inside a group chat to allow a user to send a message to desired members in the group and/or delete a message for the subset of people within the group where end-to-end encryption is utilized. To avoid a security risk of sending a message to all the participants in a group chat, one or more embodiments provide techniques to selectively exclude recipients from an end-to-end encryption enabled group chat. As discussed herein, end-to-end encryption means that the content of a message can be viewed only by the people sending and receiving messages within the group chat. The content of the message cannot be decrypted and read by a third party such as the company that supports the messaging application.

Turning now to FIG. 1, a computer system 100 is generally shown in accordance with one or more embodiments of the invention. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101a, 101b, 101c, etc., (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS) or its successors like Unified Extensible Firmware Interface (UEFI), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system to coordinate the functions of the various components shown in FIG. 1.

Additional input/output devices are shown as connected to the system bus 102 via a display adapter 115 and an interface adapter 116. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by the display adapter 115, which may include a graphics controller to improve the performance of graphics intensive applications and a video controller. A keyboard 121, a mouse 122, a speaker 123, a microphone 124, etc., can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI) and the Peripheral Component Interconnect Express (PCIe). Thus, as configured in FIG. 1, the computer system 100 includes processing capability in the form of the processors 101, storage capability including the system memory 103 and the mass storage 110, input means such as the keyboard 121, the mouse 122, and the microphone 124, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
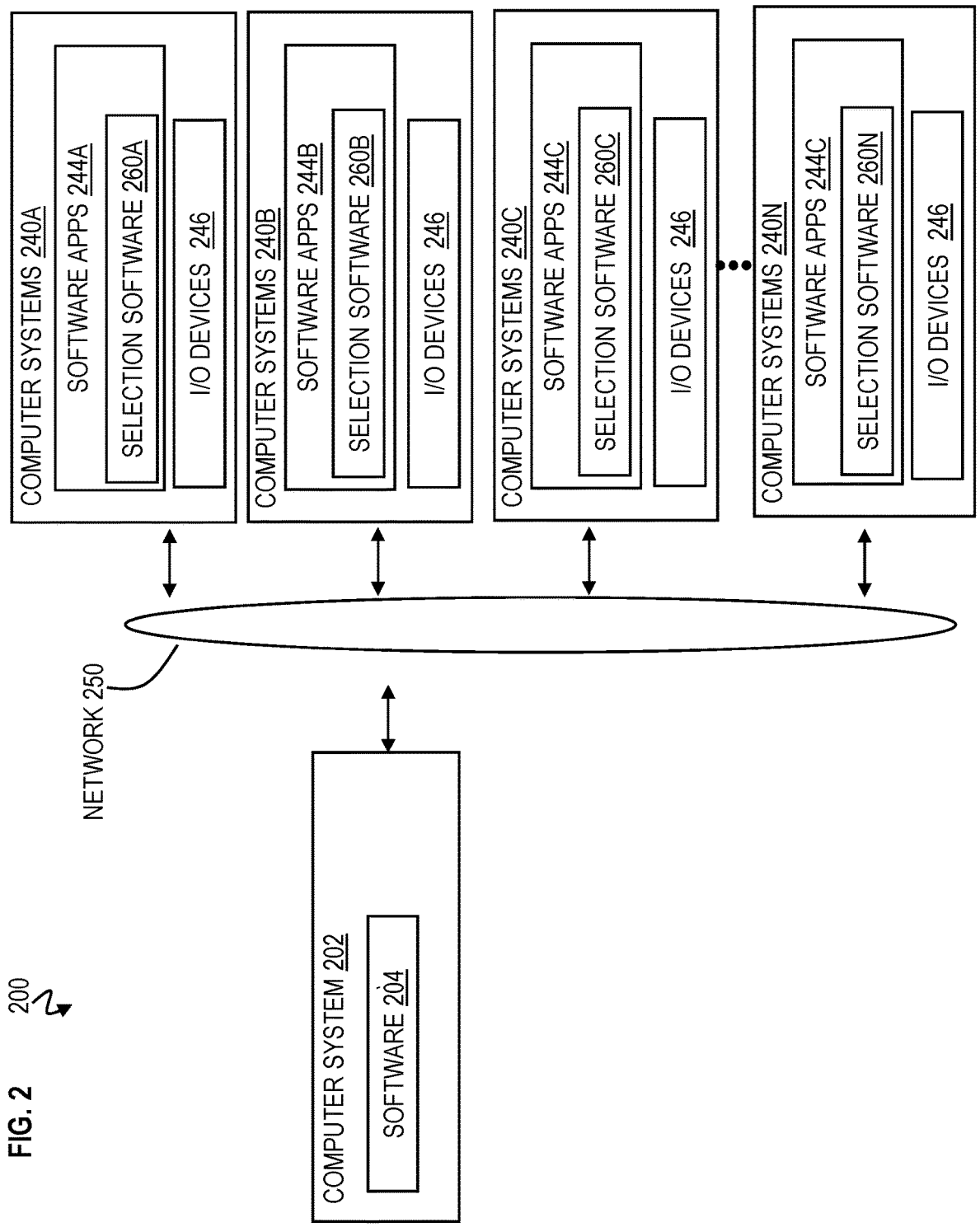
FIG. 2 depicts a block diagram of an example system configured to selectively exclude recipients from an end-to-end encryption enabled group chat according to one or more embodiments of the present invention.

FIG. 2 depicts a block diagram of an example system 200 configured to selectively exclude one or more recipients from an end-to-end encryption enabled group chat according to one or more embodiments. The system 200 includes a computer system 202 configured to communicate over a network 250 with many different computer systems, such as a computer system 240A, a computer system 240B, a computer system 240N. The computer systems 240A, 240B, through 240N can generally be referred to as computer systems 240 and are utilized for communication between one another, such as for phone calls, video calls, messaging including short message service (SMS) and multimedia messaging service (MMS), etc. The computer systems 240 can be representative of user terminals utilized by respective users in the group chat. The computer systems 240 can be representative of mobile devices including smart devices, desktop computers, laptop computers, tablet computers, etc. A smart device is an electronic device, generally connected to other devices or networks via different wireless protocols that can operate to some extent interactively. Several notable types of smart devices are smartphones, smartwatches, smart bands, smart glasses, and many others. The network 250 can be a wired and/or wireless communication network, and the communication network includes a telecommunications network, the public switched telephone network (PTSN), voice over IP (VOIP) network, etc. The communication network includes cellular networks, satellite networks, etc.

For explanation purposes and not limitation, some example scenarios may identify a sender as a user of computer system 240A and recipients as the users of the computer systems 240B-240N. It should be appreciated that any of the users can be a sender and recipient in the group chat. For example, any of the computer systems 240 could be a sender of a message while other computer systems 240 are the recipients of the message, and vice versa.

The computer systems 240 can include various software and hardware components including software applications (apps) 244 for communicating with one another over the network 250 as understood by one of ordinary skill in the art. In one or more embodiments, the software applications 244 can include messaging applications with end-to-end encryption for communicating as discussed herein. The software applications can be referred to as messaging software applications 244.

As noted herein, messaging applications, messenger applications, chat applications, instant messaging applications, etc., are formed of software that enables messages to be sent and received by the computer systems 240. The messages may be text as well as audio and video. In addition to voice calls, video calls, and text, users of messaging applications can send and receive files, images, audio, location data, emojis, documents, etc., via the computer systems 240. The software applications 244 are messaging applications in which a user can create a group to communicate with other users by sending and receiving messages to the entire group in a group chat. A group chat is the type of chat that allows users to communicate with multiple people at the same time, for example, each using their respective computer systems 240.

The software application 244 uses end-to-end encryption for the group chat. For end-to-end encryption of the group chat, encrypted data sent from the sender computer system 240 is only viewable by those with decryption keys at the receiver computer systems 240. In other words, end-to-end encryption prevents unintended users, including third parties, from reading or modifying data when only the intended readers should have this access and ability. End-to-end encryption begins with cryptography, a method for protecting information by transforming the information into an unreadable format called ciphertext. Only users who possess a secret key (for example, at the receiver computer systems 240) can decipher or decrypt the message into plaintext. With end-to-end encryption, the sender or creator encrypts the data at the sender computer system 240, and only the intended receiver or reader can decrypt the data at the receiver computer system 240. Asymmetric or public-key cryptography encrypts and decrypts the data using two separate cryptographic keys. The public key is used to encrypt a message at the sender computer system 240 and send it to the public key's owner. Then, the message can only be decrypted using a corresponding private key at the receiver computer system 240, also known as a decryption key. For example, the Transport Layer Security (TLS) encryption protocol keeps third parties from intercepting messages in transit.

Further, the software application 244 can utilize a cryptographic key called an ephemeral key that is generated for each execution of a key establishment process that meets requirements of the key type (e.g., unique to each message or session).

The messaging application incorporated in the software applications 244 can utilize any suitable end-to-end encryption method for group chats as known by one of ordinary skill in the art. In one or more embodiments, the software applications 244 can communicate with one another using the Signal Protocol (formerly known as the TextSecure Protocol). The signal protocol is a non-federated cryptographic protocol that provides end-to-end encryption for voice and instant messaging conversations. The signal protocol provides confidentiality, integrity, authentication, participant consistency, destination validation, forward secrecy, post-compromise security (aka future secrecy), causality preservation, message unlinkability, message repudiation, participation repudiation, and asynchronicity. The signal protocol also supports end-to-end encrypted group chats. The group chat protocol may be a combination of a pairwise double ratchet and multicast encryption. In addition to the properties provided by the one-to-one protocol, the group chat protocol provides speaker consistency, out-of-order resilience, dropped message resilience, computational equality, trust equality, subgroup messaging, as well as contractible and expandable membership.

Each of messing software applications 244A-244N can include and/or be coupled to selection software 260A-260N, respectively. The selection software 260A-260N can generally be referred to as selection software 260. The selection software 260 can be a piece of software added as an update, plug-in, etc., to any known messaging application in order to provide selectivity to exclude one or more members of an existing group chat from receiving a new group chat message while other members receive the new group chat message, without modifying, changing, and/or deleting members from the group. When a new message is to be sent, the selection software 260 is configured to selectively exclude one or more members in an existing group chat from an end-to-end encryption enabled group chat such that the excluded members do not receive the new message but instead receive a system message that causes predetermined actions on the computer systems 240 of the excluded members.

The computer systems 240 can include one or more input/output (I/O) devices 246 including cameras, a microphone, a display, and other peripherals. The computer system 202, computer systems 240, software applications 244, software 204, selection software 260, I/O devices 246, etc., can include functionality and features of the computer system 100 in FIG. 1 including various hardware components and various software applications such as software 111 which can be executed as instructions on one or more processors 101 in order to perform actions according to one or more embodiments of the invention. The selection software 260, the software applications 244, and the software 204 can include, be integrated with, and/or call other pieces of software, algorithms, application programming interfaces (APIs), etc., to operate as discussed herein. The selection software 260 and the software applications 244 may be representative of numerous pieces of software designed to work together in order to provide cybersecurity services and protection for one or more computer systems.

The computer system 202 may be representative of numerous computer systems and/or distributed computer systems configured to provide security services to users of the computer systems 240. The computer system 202 can be part of a cloud computing environment such as a cloud computing environment 50 depicted in FIG. 10, as discussed further herein.

FIGS. 3A and 3B are a flowchart of a computer-implemented method 300 for selectively excluding one or more recipients from an end-to-end encryption enabled group chat according to one or more embodiments. The computer-implemented method 300 can be executed by the computer system 240A as the sender computer in this example scenario. The users of computer systems 240A-240N are in an existing group chat with end-to-end encryption, where each computer system 240 has its own private key and the public keys of other computer systems 240 in the group chat. For example, the computer system 240A has its own private key for decrypting messages that have been encrypted with its public key, where only the public key is provided to the public, which are the other computer systems 240 in the group chat. The same applies by analogy for all of the computer systems 240 in the group chat. In one or more embodiments, the public keys and private keys may be ephemeral keys that are updated for each session, updated for a predefined time, etc. In one or more embodiments, the ephemeral keys for each member can be generated periodically generated from the respective private keys of the members, resulting in ephemeral public keys that can be utilized to encrypt messages. In one or more embodiments, the ephemeral keys are temporary public keys. As understood by one of ordinary skill in the art, there is a one-to-one relationship between the public key and the private key for a computer system 240, such that each computer system 240 has a public key private key pair. In one or more embodiments, the computer system 240A can communicate with the other computer systems 240B-240N via the computer system 202, although the computer system 202 cannot decrypt messages because each computer system 240 maintains its own private key. Reference can be made to any figures discussed herein.

At block 302 of the computer-implemented method 300, the messaging software application 244A of computer system 240A is configured to receive user input of a new group chat message for a previously existing group chat. For example, the existing group chat may have one-hundred or more members, each with their own public and private key pair. Previous messages have been sent and received by the members of the existing group chat using end-to-end encryption, prior to sending the new group chat message. The sender, which is the user of the computer system 240A, is creating a new group chat message to send to the other computer systems 240B-240N of members in the existing group chat.

At block 304, the messaging software application 244A of computer system 240A is configured to check whether the user input is a selection to exclude one or more members of the group from being a recipient of the new group chat message, without creating a new group chat. In one or more embodiments, the selection software 260A displays options for the sender to exclude one or more members in the existing group chat from receiving the new group chat message.

Figure 4:
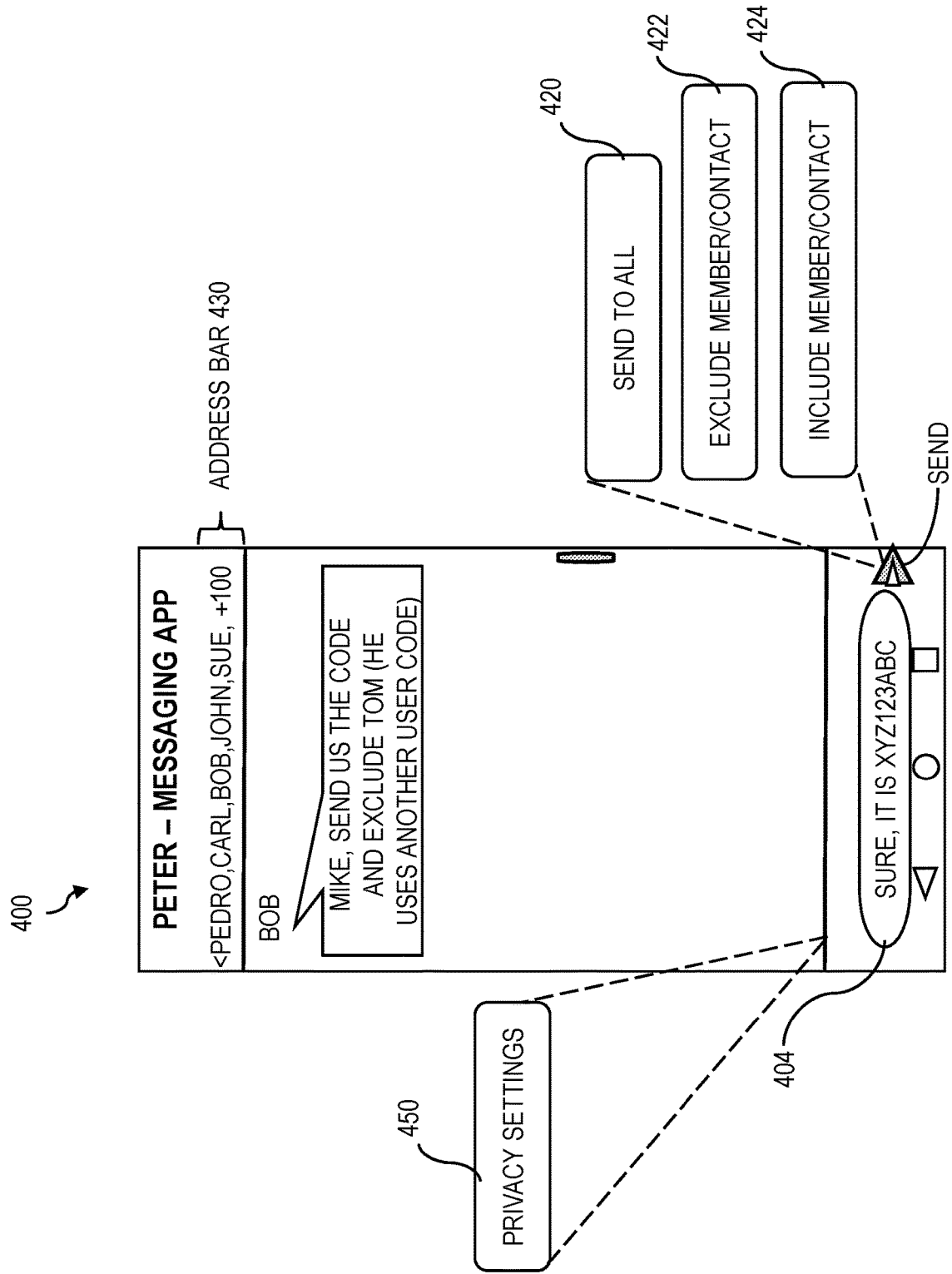
FIG. 4 depicts an example screen of a graphical user interface displayed for a sender of a new group chat message to selectivity exclude one or more members from receiving the new group chat message according to one or more embodiments of the present invention.

FIG. 4 depicts an example screen 400 of a graphical user interface (GUI) of the messaging software application 244 displayed for the sender of a new group chat message 404 to provide the sender with selectivity to exclude one or more members from receiving the new group chat message 404 according to one or more embodiments. In the example screen 400, the messaging software application 244 displays a selectable option 420 (e.g., a button) to send the new group chat message 404 to all members, a selectable option 422 (e.g., a button, input field, etc.) to exclude one or more members in the existing group chat while the new group chat message 404 is sent to the remaining members of the group chat, and/or a selectable option 424 (e.g., a button, input field, etc.) to selectively include one or more members to (only) receive the new group chat message 404 while the other members are excluded.

When the selectable option 420 is selected by the sender, the messaging software application 244 sends the new group chat message 404 to all members of the group using end-to-end encryption. The selectable option 420 does not exclude any members from the group. The selectable option 420 sends the new group chat message 404 to all the members/contacts in the address bar 430 of the group. In this example, the address bar 430 illustrates that there are more than hundred members/contacts.

When the selectable option 422 is selected by the sender, the messaging software application 244 is configured to receive input of one or more members/contacts who are to be excluded from receiving the new group chat message 404, while the new group chat message 404 is to be sent to the remaining non-excluded members of the group chat without creating a new group chat and without modifying the members in the existing group chat. In other words, the address bar 430 continues to include all the hundred plus members/contacts that are viewable to all members of the group before, during, and after the new group chat message 404 is sent to some member but not the excluded members. Additionally, the selectable option 422 may display an input field for the sender to enter the members/contacts that are to be excluded and/or may display a listing of the members/contacts from which a selection causes the selected members/contacts of the listing to be excluded from receiving the new group chat message 404.

When the selectable option 424 is selected by the sender, the messaging software application 244 is configured to receive input of one or more members/contacts that are to be included as recipients of the new group chat message 404, while the new group chat message 404 is to not be sent to any members of the group chat that are not included as the recipients; the selectable option 424 is executed without creating a new group chat and without modifying the members in the existing group chat. In other words, the address bar 430 continues to include all the hundred plus members/contacts that are viewable to all members of the group before, during, and after the new group chat message 404 is sent to some member but not the excluded members. Additionally, the selectable option 424 may display an input field for the sender to enter the members/contacts that are to be excluded and/or may display a listing of the members/contacts from which a selection causes the selected members/contacts of the listing to be excluded from receiving the new group chat message 404.

Figure 5:
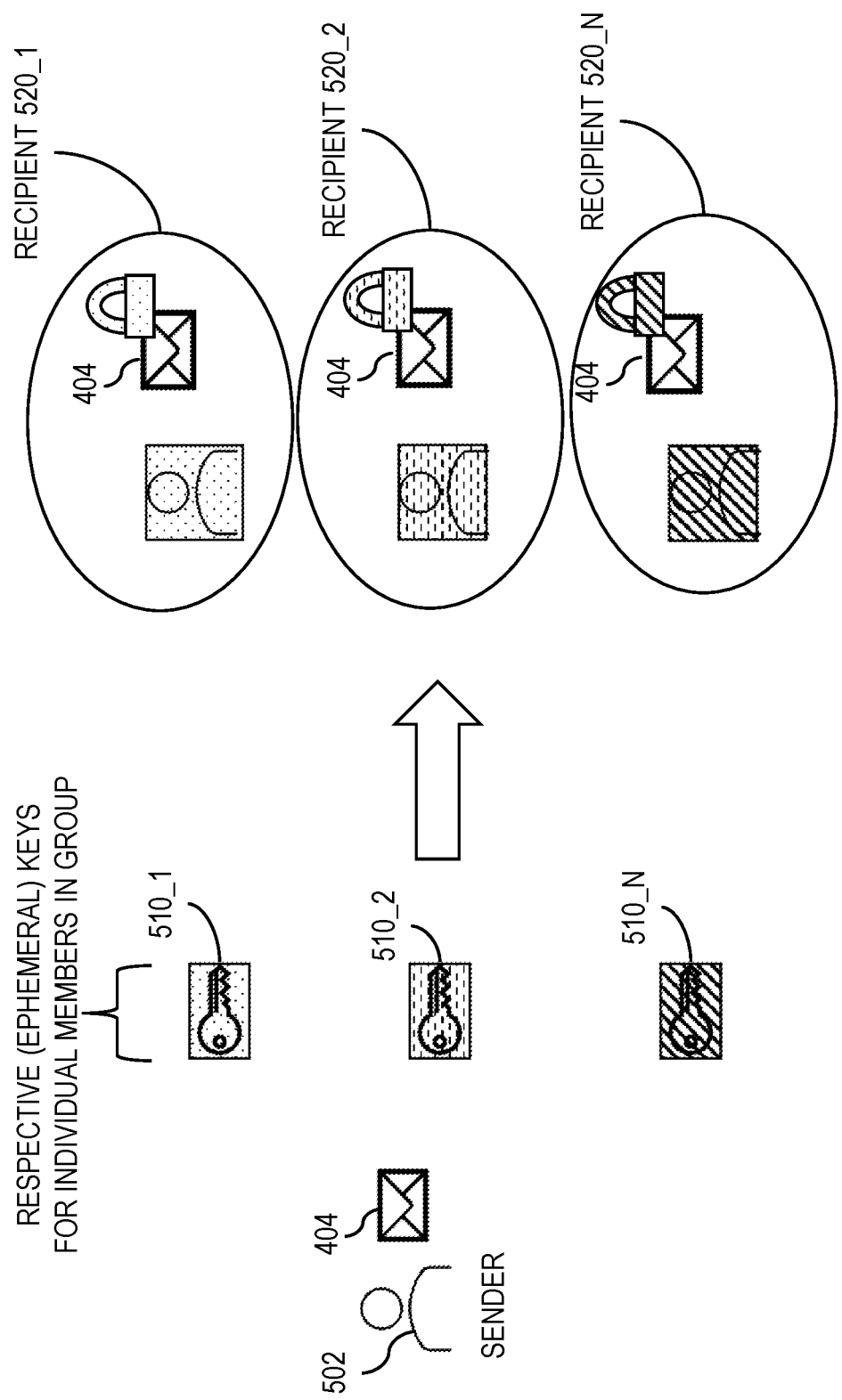
FIG. 5 depicts an example of sending a new group chat message using end-to-end encryption according to one or more embodiments of the present invention.

Referring to FIG. 3A, at block 306, when there is not a selectable user input to exclude any member of the chat group from being a recipient of the new group chat message 404, the messaging software application 244A of computer system 240A is configured to process the group chat message 404 normally by causing the new group chat message to be sent to all members of the group chat. FIG. 5 depicts an example for sending a new group chat message using end-to-end encryption. In FIG. 5, a sender 502 using, for example, the computer system 240A, sends the new group chat message 404 to all members. As seen in FIG. 5, upon sending the new group chat message 404, the messaging software application 244A is configured to use a fan-out approach every time a user sends a message to the group, such that the messaging software applications 244A encrypts each new group chat message 404 separately using the individual (ephemeral) public key for each user. A separately and distinctively encrypted new group chat message 404 is sent to each recipient 520_1, 520_2, and 520_N. Upon receipt of the new group chat message 404, each of the members can use its own (secret) private key to decrypt the new group chat message 404. For example, a public key 510_1 is used to encrypt the group chat message 404 for a recipient 520_1 that uses its corresponding private key to decrypt the group chat message 404 on the computer system 240. Likewise, a public key 510_2 is used to encrypt the group chat message 404 for a recipient 520_2 that uses its corresponding private key to decrypt the group chat message 404 on the computer system 240. Similarly, a public key 510_N is used to encrypt the group chat message 404 for a recipient 520_N that uses its corresponding private key to decrypt the group chat message 404 on the computer system 240. Although the encrypted group chat messages 404 may pass through one or more computer systems 202, the computer system 202 cannot read the encrypted group chat messages 404, because each of the computer systems 240 has its own private key to respectively decrypt the encrypted group chat message 404. Each time a messaging software application 244 receives a new group chat message, the messaging software application 244 applies its own (unique) private key to the received new group chat message in order to decrypt the received new group chat message.

Referring to FIG. 3A, at block 308, when a selectable user input is utilized to exclude one or more members of the chat group from being a recipient of the new group chat message 404, the messaging software application 244A of computer system 240A is configured to display, receive, and/or capture the sender selection of a privacy type for the excluded members. For example, the messaging software application 244A is configured to receive the selection of the selectable option 422 or selectable option 424, which both can be utilized to exclude one or more members of the existing group chat from receiving the new group chat message. Once one or more members are marked for exclusion, the messaging software application 244A is configured to display privacy type settings 450 to the sender for selection, in which the privacy type settings 450 instruct the recipient computer system 240 how to trigger an action in place of receiving the new group chat message 404. A first privacy setting can cause the recipient computer systems 240 of the excluded members to display a blank message to the members excluded from receiving the new group chat message 404. A second privacy setting can cause the recipient computer system 240 of the excluded members to display an obfuscated message to the members excluded from receiving the new group chat message 404. A third privacy setting can cause the recipient computer system 240 of the excluded members to display no new message while ignoring any indication that the new group chat message 404 was not sent.

At block 310, the messaging software application 244A of computer system 240A is configured to associate the respective (ephemeral) public keys with the respective members of the group chat except for the excluded members. In this case, the excluded members are not going to have an encrypted messaged delivered to their respective computer systems 240, while the other members who are not excluded are having their respective (ephemeral) public keys separately utilized to encrypt the new group chat message 404.

At block 312, the messaging software application 244A of computer system 240A is configured to send the new group chat message 404 encrypted by the respective (ephemeral) public keys to all the members of the group chat except for the excluded members, while sending a system message (e.g., system message 604 in FIG. 6) that is not encrypted with a respective (ephemeral) public key to the excluded members. The system message includes the privacy setting as a code, command, and/or instruction for execution by the computer systems 240 of the excluded members.

Figure 6:
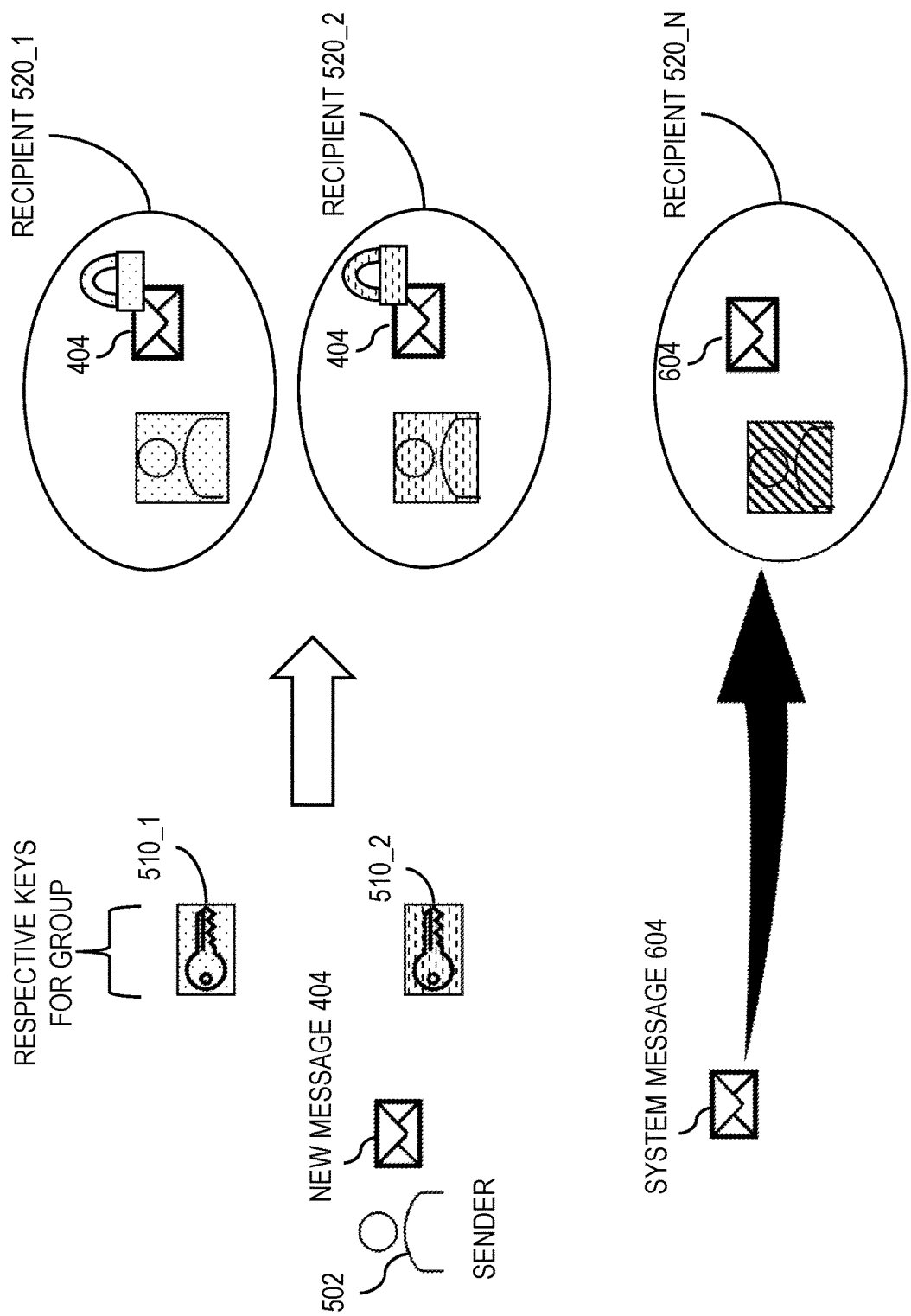
FIG. 6 depicts an example of sending a new group chat message using end-to-end encryption to some members of an existing group chat while sending a system message to excluded members of the group chat according to one or more embodiments of the present invention.

FIG. 6 depicts an example of sending a new group chat message 404 using end-to-end encryption to some members of an existing group chat while sending a system message 604 to excluded members of the same existing group chat without creating a new group chat and without removing any members from the group chat. In other words, the displayed address bar 430 on all the computer systems 240A-240N in the group continues to display all the hundred plus members/contacts that are viewable to all members (including the excluded members) of the group before, during, and after the new group chat message 404 is sent to some member but not the excluded members. In FIG. 6, a sender 502 using, for example, the computer system 240A, generates and sends the new group chat message 404 to some members of the group. As seen in FIG. 6, once the new group chat message 404 is generated, the messaging software application 244A is configured to use a fan-out approach every time a user sends a message to the group, such that the messaging software applications 244A encrypts each new group chat message 404 separately using the individual (ephemeral) public key for each user. In FIG. 6, the messaging software application 244A on computer system 240A (as the sender) uses the public key 510_1 corresponding to the computer system 240B to encrypt the group chat message 404 for the recipient 520_1 such that the messaging software application 244B on computer system 240B can use its corresponding private key to decrypt the group chat message 404. Likewise, the messaging software application 244A on computer system 240A (as the sender) uses the public key 510_2 corresponding to the computer system 240C to encrypt the group chat message 404 for the recipient 520_2 such that the messaging software application 244C on computer system 240C can use its corresponding private key to decrypt the group chat message 404.

However, for the excluded members, the messaging software application 244A on computer system 240A (as the sender) does not send the new group chat message 404 to the computer systems 240 of the excluded members and does not use their respective public keys to encrypt to the system message 604. Rather, the messaging software application 244A on computer system 240A (as the sender) sends the system message 604, having one of the privacy settings and/or having instructions/commands corresponding to one of the privacy settings, to the computer systems 240 of each of the excluded members. In FIG. 6, the system message 604 is sent to the recipient 520_N of computer system 240N. The messaging software application 244N does not require use of its private key to decrypt the system message 604. Instead, the messaging software application 244N, for example, using the selection software 260N, is configured to parse and identify the privacy setting in the system message 604 and automatically perform one or more actions based on the type of privacy setting selected by the sender.

Referring to FIG. 3B, at block 314, the messaging software application 244A of computer system 240A is configured cause the messaging software application (e.g., messaging software application 244N) to execute actions based on the content (e.g., privacy setting) of the system message 604. For example, the messaging software application 244A causes the messaging software application (e.g., messaging software application 244N) to execute actions based on the privacy setting selected by the sender. In one or more embodiments, the content of the privacy setting may be a code that identifies the actions for the recipient messaging software application (e.g., messaging software application 244N). The code can cause instructions, for example, of the selection software 260, to be executed on the computer systems 240 of the excluded members according to the privacy settings. Further discussion is provided below in FIG. 7 regarding example actions executed by the recipient computer systems 240 of the members of the group chat excluded from receiving the new group chat message 404.

At block 316, the messaging software application 244A of computer system 240A is configured cause the messaging software application (e.g., messaging software application 244N) to delete the system message 604 for the excluded members, for example, based on an instruction sent.

At block 318, the messaging software application 244A of computer system 240A may prompt the computer system 202 to distribute a new set of keys to all the members of the group chat, including the previously excluded members, for the upcoming message.

Figure 7:
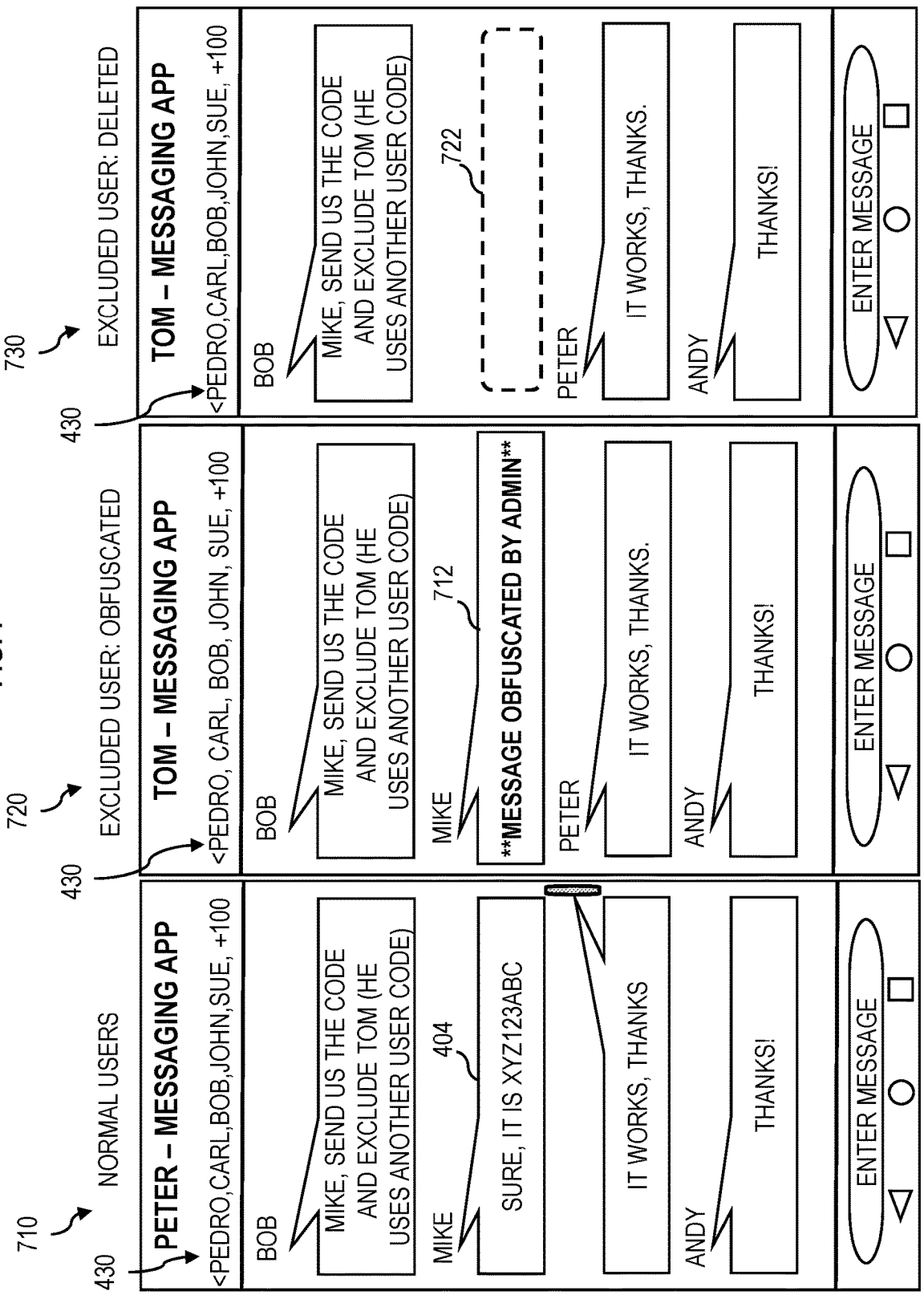
FIG. 7 depicts example screens of a graphical user interface of the messaging software application displayed for members of an existing group chat according to one or more embodiments of the present invention.

Now turning to FIG. 7, depicted are example screens of a graphical user interface of the messaging software application 244 displayed for members of an existing group chat where one or more members are excluded from receiving the new group chat message 404 while other members receive the new group chat message 404 according to one or more embodiments. In the example scenario depicted in FIG. 7, a member (e.g., Bob) has requested that a user code be sent to the group chat but for at least one member (e.g., Tom) to be excluded from receiving the user code. As discussed herein, the sender (e.g., Mike) can use the messaging software application 244 to generate the new group chat message 404 with the requested user code (e.g., XYZ123ABC) and select the selectable option 422 to exclude members/contacts from receiving the new group chat message 404 as depicted in FIG. 4. In this case, the sender (e.g., Mike) inputs the member/contact for the excluded member (e.g., Tom) and/or selects the excluded member/contact from a listing of members/contacts such as a drop down list/menu. In response to the sender (e.g., Mike) selecting the send button to send the new group chat message 404, the messaging software application 244 of the sender automatically sends and/or causes the new group chat message 404 to be sent to the members as depicted in FIG. 6, such that the system message 604 is sent to the excluded member(s) (e.g., Tom). Referring to FIG. 7, a screen 710 depicts the graphical user interface displayed to normal users who are the members of the group chat that were not excluded from receiving the new group chat message 404. In screen 710, the new group chat message 404 is displayed under the message from Bob.

In FIG. 7, screens 720 and 730 depict examples of the graphical user interfaces that may be displayed to an excluded member (e.g., Tom) who did not receive the new group chat message 404 but instead received the system message 604, where the display differs according to the code or instructions for the privacy setting associated with the system message 604. As discussed herein, the sender of the system message 604 can select privacy settings associated with the excluded members who receive the system message 604, which correspondingly causes actions to be executed on the recipient computer system 240 of the excluded members. In one or more embodiments, the selected privacy setting could be different for different excluded members. In one example, when processing a privacy setting for the system message 604 received by the excluded member, the messaging software application 244 of the excluded member is configured to display an obfuscated message 712 to the members excluded from receiving the new group chat message 404 as illustrated in the screen 720. The obfuscated message 712 indicates that the sender (e.g., Mike) sent a new group chat message but the content of the new group chat message is obfuscated or not displayed in the screen 720.

In another example, when processing a different privacy setting for the system message 604 received by the excluded member, the messaging software application 244 of the excluded member is configured to display a blank message 722 to the members excluded from receiving the new group chat message 404 as illustrated in the screen 730. The blank message 722 indicates that a new group chat message was sent to the group chat, but no content is provided at the displayed location of the blank message 722 in the screen 730. In some embodiments, the blank message 722 does not display the sender, just as Mike is not displayed in the screen 730. In some embodiments, the identification of the sender (e.g., Mike) may be displayed along with the blank message 722. Similarly, the option of displaying or not displaying the sender is available for the obfuscated message 712 in the screen 720.

Figure 8:
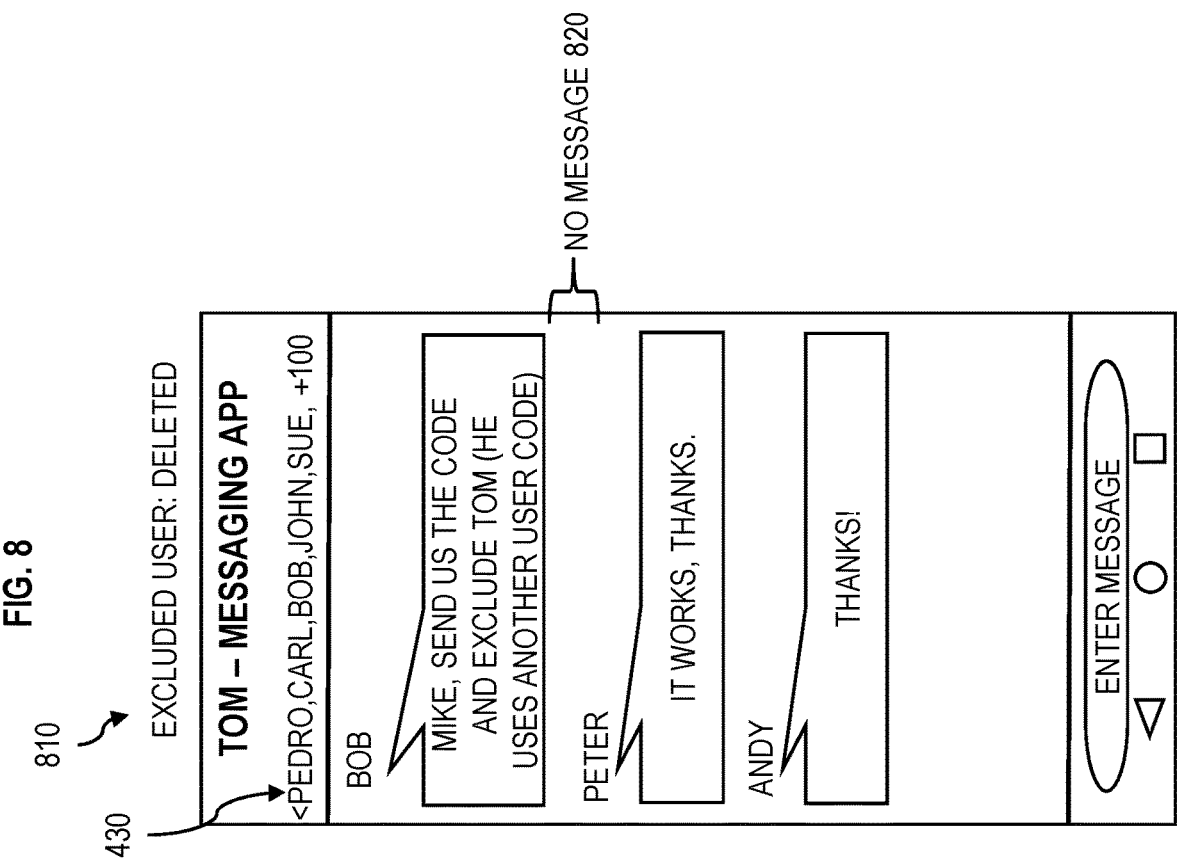
FIG. 8 depicts an example screen of a graphical user interface of the messaging software application displayed for members of an existing group chat according to one or more embodiments of the present invention.

Additionally, there can be a visual display in the screen 730 where the blank screen 722 is not present. That is, the view of a screen 810 of a graphical user interface for the excluded members is displayed as though no message 820 was ever sent to the other members who received the new group chat message 404, such that the excluded members have no notice or indication of the missing new group chat message 404, as depicted in FIG. 8.

It is noted that the address bar 430 continues to identify all the members/contacts in the group chat on the screens 710, 720, 730, and 810 even though the excluded members did not receive the new group chat message 404 at their computer systems 240. No new group chat with different members is created that omits the excluded members, even when some members receive the new group chat message 404 and excluded members of the group receive the system message 604. Each of the members continues to receive subsequent group chat messages without requiring a modification to the members/contacts in the address bar 430.

Although some examples may discuss a single excluded member/contact that does not receive the new group chat message 404, it should be appreciated that there can be numerous members/contacts excluded from receiving the new group chat message 404, while other members received the new group chat message 404. Accordingly, the example description and scenarios provided herein for one excluded member/contact apply by analogy to numerous excluded members/contacts, who each receive the unencrypted system message 604 in place of the encrypted new group chat message 404.

Figure 9:
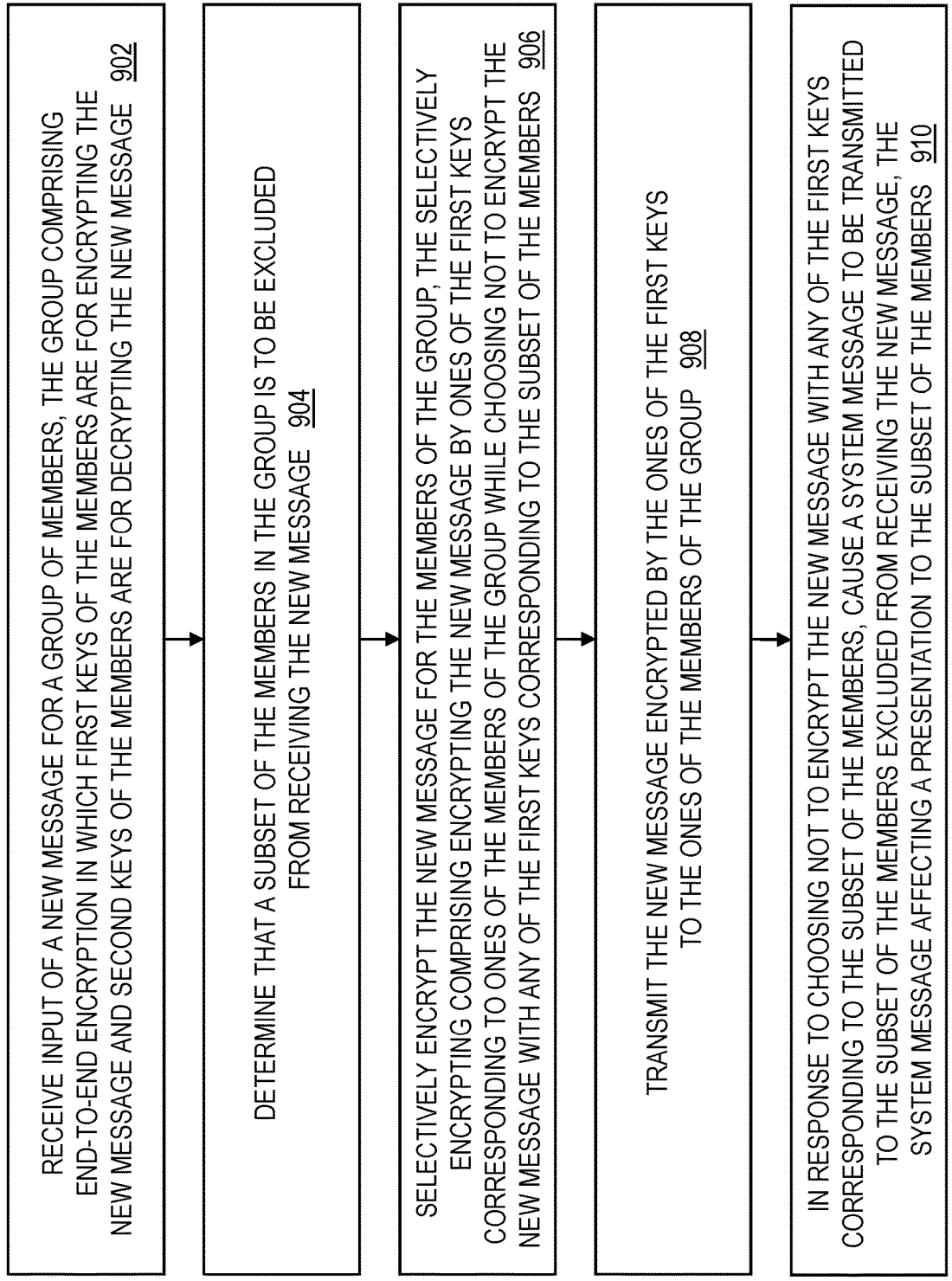
FIG. 9 is a flowchart of a computer-implemented method for selectively excluding one or more recipients from an end-to-end encryption enabled group chat according to one or more embodiments of the present invention.

FIG. 9 is a flowchart of a computer-implemented method 900 for selectively excluding one or more recipients from an end-to-end encryption enabled group chat without removing excluded members from the address bar or display bar presented to all the members, such that the members identified and displayed in the group chat remain the same before, during, and after sending the new group chat message according to one or more embodiments. To continue the example scenario and for explanation purposes, the sender can be represented as the user of the messaging software application 244A on the computer system 240A, but it should be understood that any of the members of the group chat can be the sender and recipient of new messages. Reference can be made to any figures discussed herein.

At block 902 of the computer-implemented method 900, the messaging software application 244A of the computer system 240A is configured to receive input of a new message 404 for a group of members, the group comprising end-to-end encryption in which first keys of the members are for encrypting the new message 404 and second keys of the members are for decrypting the new message 404.

At block 904, the messaging software application 244A of the computer system 240A is configured to determine that a subset of the members in the group is to be excluded from receiving the new message. The subset can include one or more excluded members input using the selectable option 422. The subset can be determined by the sender inputting the non-excluded members to receive the new group chat message 404 using the selectable option 424, and the remaining members are the subset of excluded members.

At block 906, the messaging software application 244A of the computer system 240A is configured to selectively encrypt the new message 404 for the members of the group, the selectively encrypting comprising encrypting the new message by ones of the first keys corresponding to ones of the members of the group while choosing not to encrypt the new message with any of the first keys corresponding to the subset of the members.

At block 908, the messaging software application 244A of the computer system 240A is configured to transmit the new message 404 encrypted by the ones of the first keys to the ones of the members of the group, as depicted in FIGS. 5 and 6.

At block 910, the messaging software application 244A of the computer system 240A is configured to, in response to choosing not to encrypt the new message 404 with any of the first keys corresponding to the subset of the members, transmit or cause a system message 604 to be transmitted to the subset of the members excluded from receiving the new message 404, the system message 604 affecting or determining a visual presentation displayed to the subset of the members. Reference can be the transmission of the (unencrypted) system message 604 in FIG. 6.

According to one or more embodiments, determining that the subset of the members in the group is to be excluded from receiving the new message 404 is based on a selection by a sender of the new message. Example selections include the selectable options 422 and 424.

A selection causes the presentation/display of a blank message 722 (e.g., depicted in the screen 730 of FIG. 7) to the subset of the members while causing the new message 404 (e.g., depicted in the screen 710 of FIG. 7) to be presented/displayed to the ones of the members, in response to choosing not to encrypt the new message with any of the first keys corresponding to the subset of the members. A selection causes the presentation/display of an obfuscated message 712 (e.g., depicted in the screen 720 of FIG. 7) to the subset of the members while causing the new message 404 (e.g., depicted in the screen 710 of FIG. 7) to be presented/displayed to the ones of the members, in response to choosing not to encrypt the new message with any of the first keys corresponding to the subset of the members. A selection causes the presentation/display of no message 820 (e.g., depicted in the screen 810 of FIG. 8) to the subset of the members while causing the new message 404 (e.g., depicted in the screen 710 of FIG. 7) to be presented/displayed to the ones of the members, in response to choosing not to encrypt the new message with any of the first keys corresponding to the subset of the members.

The system message 604 is associated with a command that causes the presentation/display to the subset of the members. The command is in accordance with privacy setting set by the sender. Choosing (as instructed by the messaging software application 244A) not to encrypt the new message 404 with any of the first keys corresponding to the subset of the members disengages the end-to-end encryption for the subset in order to cause no transmission of the new message 404 to the subset of the members. For example, the messaging software application 244A (e.g., using selection software 260A) is configured to recognize the selection of the selectable options 422 and 424 as instructions to disengage the end-to-end encryption of the excluded members.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
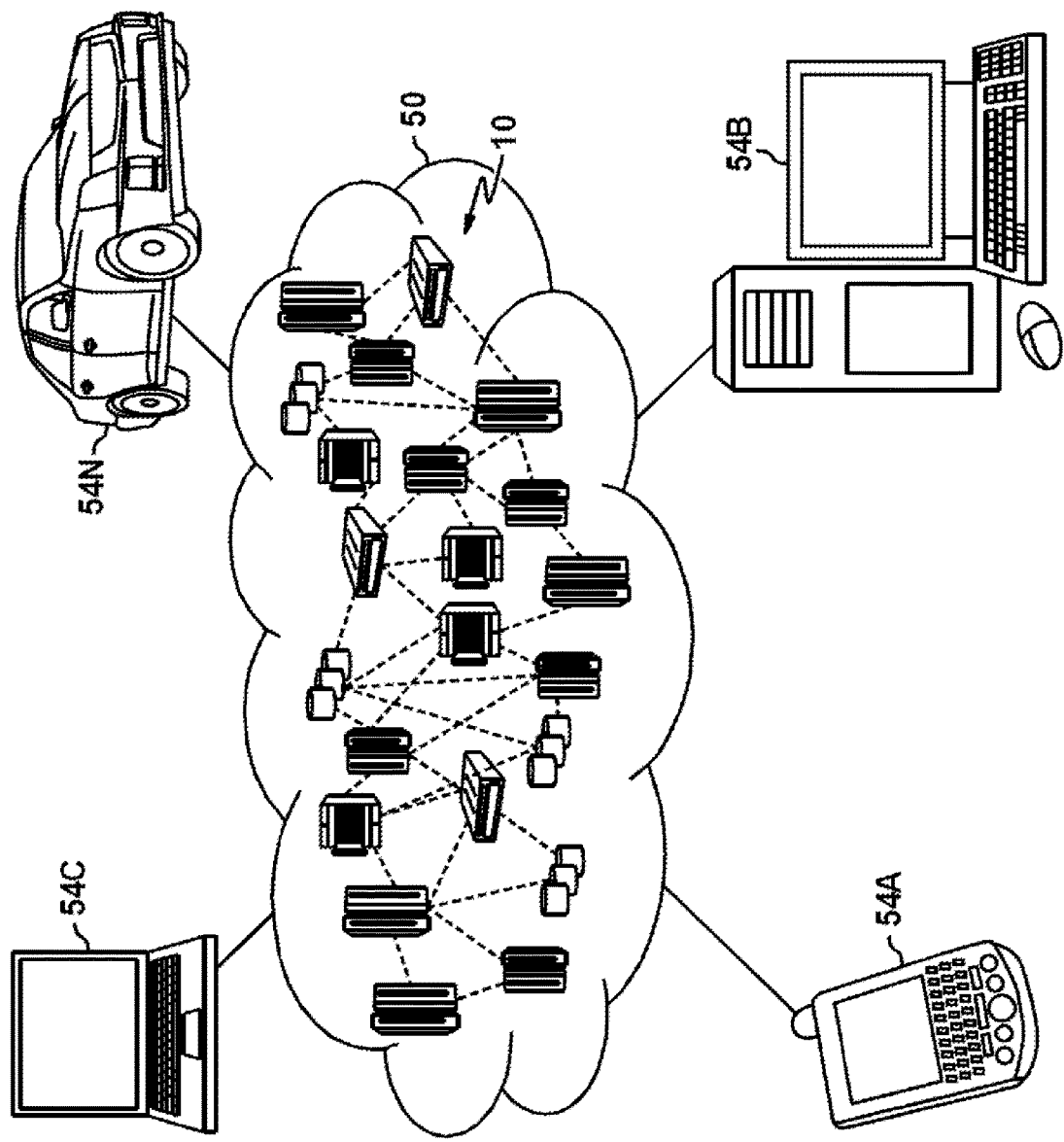
FIG. 10 depicts a cloud computing environment according to one or more embodiments of the present invention.

Referring now to FIG. 10, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described herein above, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Figure 11:
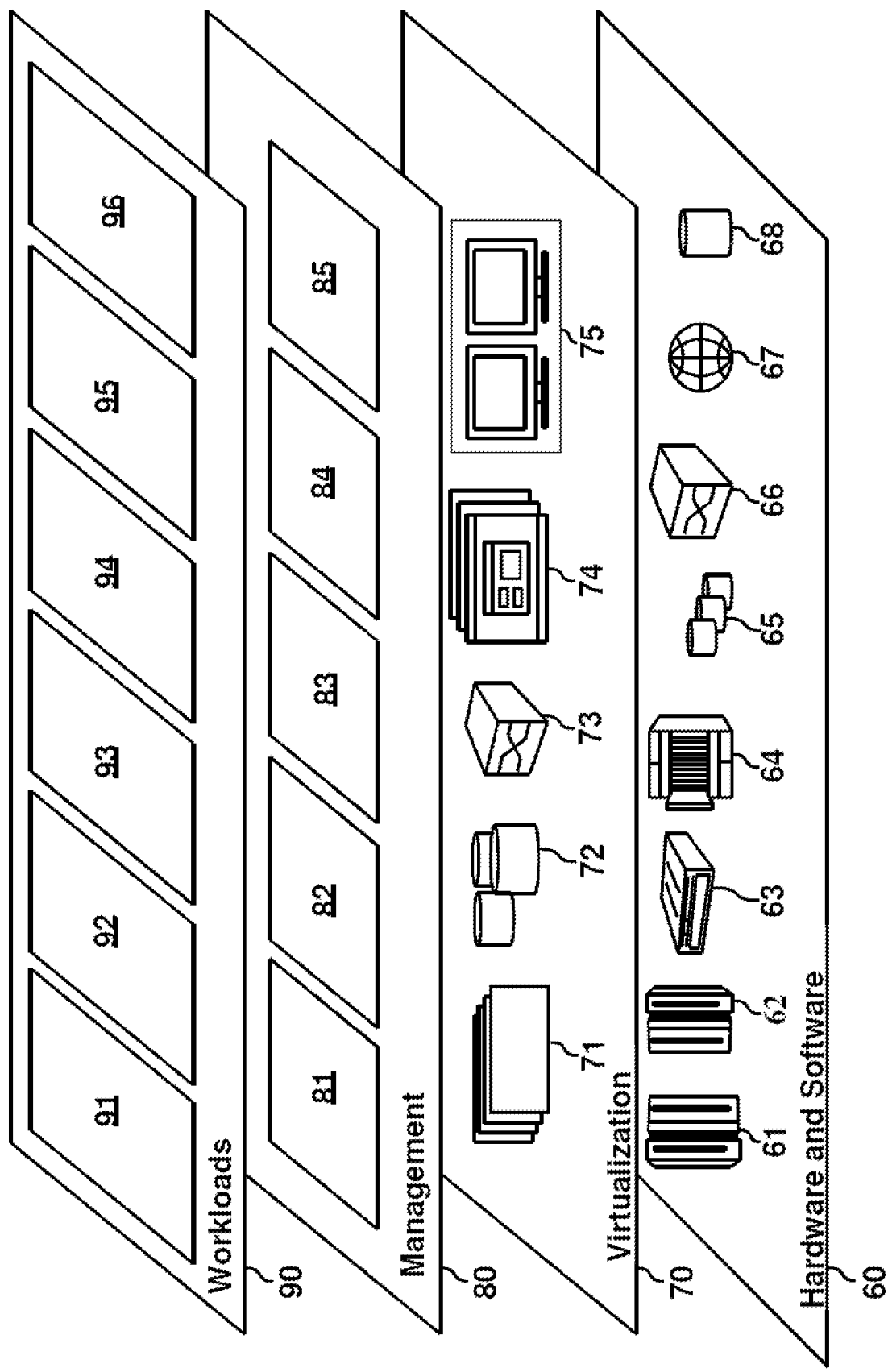
FIG. 11 depicts abstraction model layers according to one or more embodiments of the present invention.

Referring now to FIG. 11, a set of functional abstraction layers provided by cloud computing environment 50 (depicted in FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and workloads and functions 96.

Various embodiments of the present invention are described herein with reference to the related drawings. Alternative embodiments can be devised without departing from the scope of this invention. Although various connections and positional relationships (e.g., over, below, adjacent, etc.) are set forth between elements in the following description and in the drawings, persons skilled in the art will recognize that many of the positional relationships described herein are orientation-independent when the described functionality is maintained even though the orientation is changed. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted, or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
    receiving input of a new message for a group of members, the group comprising end-to-end encryption in which first keys of the members are for encrypting the new message and second keys of the members are for decrypting the new message;
    determining that a subset of the members in the group is to be excluded from receiving the new message;
    selectively encrypting the new message for the members of the group, the selectively encrypting comprising encrypting the new message by ones of the first keys corresponding to ones of the members of the group while choosing not to encrypt the new message with any of the first keys corresponding to the subset of the members;
    transmitting the new message encrypted by the ones of the first keys to the ones of the members of the group; and
    in response to choosing not to encrypt the new message with any of the first keys corresponding to the subset of the members, causing a system message to be transmitted to the subset of the members excluded from receiving the new message, the system message affecting a presentation to the subset of the members.

2. The computer-implemented method of claim 1, wherein determining that the subset of the members in the group is to be excluded from receiving the new message is based on a selection by a sender of the new message.

3. The computer-implemented method of claim 1, wherein a selection causes the presentation of a blank message to the subset of the members while causing the new message to be presented to the ones of the members, in response to choosing not to encrypt the new message with any of the first keys corresponding to the subset of the members.

4. The computer-implemented method of claim 1, wherein a selection causes the presentation of an obfuscated message to the subset of the members while causing the new message to be presented to the ones of the members, in response to choosing not to encrypt the new message with any of the first keys corresponding to the subset of the members.

5. The computer-implemented method of claim 1, wherein a selection causes the presentation of no message to the subset of the members while causing the new message to be presented to the ones of the members, in response to choosing not to encrypt the new message with any of the first keys corresponding to the subset of the members.

6. The computer-implemented method of claim 1, wherein the system message is associated with a command that causes the presentation to the subset of the members.

7. The computer-implemented method of claim 1, wherein choosing not to encrypt the new message with any of the first keys corresponding to the subset of the members disengages the end-to-end encryption for the subset in order to cause no transmission of the new message to the subset of the members.

8. A system comprising:
    a memory having computer readable instructions; and
    one or more processors for executing the computer readable instructions, the computer readable instructions when executed cause the one or more processors to perform operations comprising:
        receiving input of a new message for a group of members, the group comprising end-to-end encryption in which first keys of the members are for encrypting the new message and second keys of the members are for decrypting the new message;
        determining that a subset of the members in the group is to be excluded from receiving the new message;
        selectively encrypting the new message for the members of the group, the selectively encrypting comprising encrypting the new message by ones of the first keys corresponding to ones of the members of the group while choosing not to encrypt the new message with any of the first keys corresponding to the subset of the members;
        transmitting the new message encrypted by the ones of the first keys to the ones of the members of the group; and
        in response to choosing not to encrypt the new message with any of the first keys corresponding to the subset of the members, causing a system message to be transmitted to the subset of the members excluded from receiving the new message, the system message affecting a presentation to the subset of the members.

9. The system of claim 8, wherein determining that the subset of the members in the group is to be excluded from receiving the new message is based on a selection by a sender of the new message.

10. The system of claim 8, wherein a selection causes the presentation of a blank message to the subset of the members while causing the new message to be presented to the ones of the members, in response to choosing not to encrypt the new message with any of the first keys corresponding to the subset of the members.

11. The system of claim 8, wherein a selection causes the presentation of an obfuscated message to the subset of the members while causing the new message to be presented to the ones of the members, in response to choosing not to encrypt the new message with any of the first keys corresponding to the subset of the members.

12. The system of claim 8, wherein a selection causes the presentation of no message to the subset of the members while causing the new message to be presented to the ones of the members, in response to choosing not to encrypt the new message with any of the first keys corresponding to the subset of the members.

13. The system of claim 8, wherein the system message is associated with a command that causes the presentation to the subset of the members.

14. The system of claim 8, wherein choosing not to encrypt the new message with any of the first keys corresponding to the subset of the members disengages the end-to-end encryption for the subset in order to cause no transmission of the new message to the subset of the members.

15. A computer program product comprising a non-transitory computer readable storage medium having program instructions embodied therewith, the program instructions executable by one or more processors to cause the one or more processors to perform operations comprising:
  receiving input of a new message for a group of members, the group comprising end-to-end encryption in which first keys of the members are for encrypting the new message and second keys of the members are for decrypting the new message;
  determining that a subset of the members in the group is to be excluded from receiving the new message;
  selectively encrypting the new message for the members of the group, the selectively encrypting comprising encrypting the new message by ones of the first keys corresponding to ones of the members of the group while choosing not to encrypt the new message with any of the first keys corresponding to the subset of the members;
  transmitting the new message encrypted by the ones of the first keys to the ones of the members of the group; and
  in response to choosing not to encrypt the new message with any of the first keys corresponding to the subset of the members, causing a system message to be transmitted to the subset of the members excluded from receiving the new message, the system message affecting a presentation to the subset of the members.

16. The computer program product of claim 15, wherein determining that the subset of the members in the group is to be excluded from receiving the new message is based on a selection by a sender of the new message.

17. The computer program product of claim 15, wherein a selection causes the presentation of a blank message to the subset of the members while causing the new message to be presented to the ones of the members, in response to choosing not to encrypt the new message with any of the first keys corresponding to the subset of the members.

18. The computer program product of claim 15, wherein a selection causes the presentation of an obfuscated message to the subset of the members while causing the new message to be presented to the ones of the members, in response to choosing not to encrypt the new message with any of the first keys corresponding to the subset of the members.

19. The computer program product of claim 15, wherein a selection causes the presentation of no message to the subset of the members while causing the new message to be presented to the ones of the members, in response to choosing not to encrypt the new message with any of the first keys corresponding to the subset of the members.

20. The computer program product of claim 15, wherein the system message is associated with a command that causes the presentation to the subset of the members.

* * * * *